US012711023B2

(12) United States Patent
Gohain et al.

(10) Patent No.: US 12,711,023 B2
(45) Date of Patent: Aug. 18, 2026

(54) EFFICIENT DATA MANAGEMENT FOR MEMORY SYSTEM ERROR HANDLING

(71) Applicant: Micron Technology, Inc., Boise, ID (US)

(72) Inventors: Nitul Gohain, Bangalore (IN); Jameer Mulani, Bangalore (IN); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 59 days.

(21) Appl. No.: 18/581,275

(22) Filed: Feb. 19, 2024

(65) Prior Publication Data

US 2024/0289236 A1 Aug. 29, 2024

Related U.S. Application Data

(60) Provisional application No. 63/448,172, filed on Feb. 24, 2023.

(51) Int. Cl.
*G06F 11/00* (2006.01)
*G06F 11/1446* (2026.01)

(52) U.S. Cl.
CPC ................................ *G06F 11/1469* (2013.01)

(58) Field of Classification Search
CPC .................................................. G06F 11/1469
See application file for complete search history.

(56) References Cited

U.S. PATENT DOCUMENTS

2015/0242143 A1* 8/2015 Kim ...................... G06F 3/0679 714/704
2016/0049203 A1* 2/2016 Alrod .................... G06F 11/073 714/2
2017/0031612 A1* 2/2017 Ravimohan ............. G06F 3/065
2018/0075917 A1* 3/2018 Utsunomiya ...... G11C 16/3459
2019/0051360 A1* 2/2019 Lien ................... G11C 29/4401
2020/0104209 A1* 4/2020 El Gamal .............. G11C 29/52
2023/0402071 A1* 12/2023 Park .................... G11C 11/5671

* cited by examiner

*Primary Examiner* — Jason B Bryan
(74) *Attorney, Agent, or Firm* — Holland & Hart LLP

(57) ABSTRACT

Methods, systems, and devices for efficient data management for memory system error handling are described. If a new data transfer is desired between the controller and a memory device when the latches are full, the controller may obtain data that has been loaded in one of the latches, temporarily store that data in a buffer, and overwrite the latch with the new data associated with the new data transfer. After the controller is finished working with the new data now stored in the latch, the controller may restore the data from the buffer to the latch so the prior data transfer may continue. This may prevent loss of data or reduce the quantity of data that is temporarily lost from latches and needs to be re-transferred when the latches are full.

17 Claims, 11 Drawing Sheets

200

500

700

EFFICIENT DATA MANAGEMENT FOR MEMORY SYSTEM ERROR HANDLING

CROSS REFERENCE

The present Application for Patent claims the benefit of and priority to of U.S. Provisional Application No. 63/448,172 by Gohain et al., entitled "EFFICIENT DATA MANAGEMENT FOR MEMORY SYSTEM ERROR HANDLING," filed Feb. 24, 2023, assigned to the assignee hereof, and is expressly incorporated by reference in its entirety herein.

TECHNICAL FIELD

The following relates to one or more systems for memory, including efficient data management for memory system error handling.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), three-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
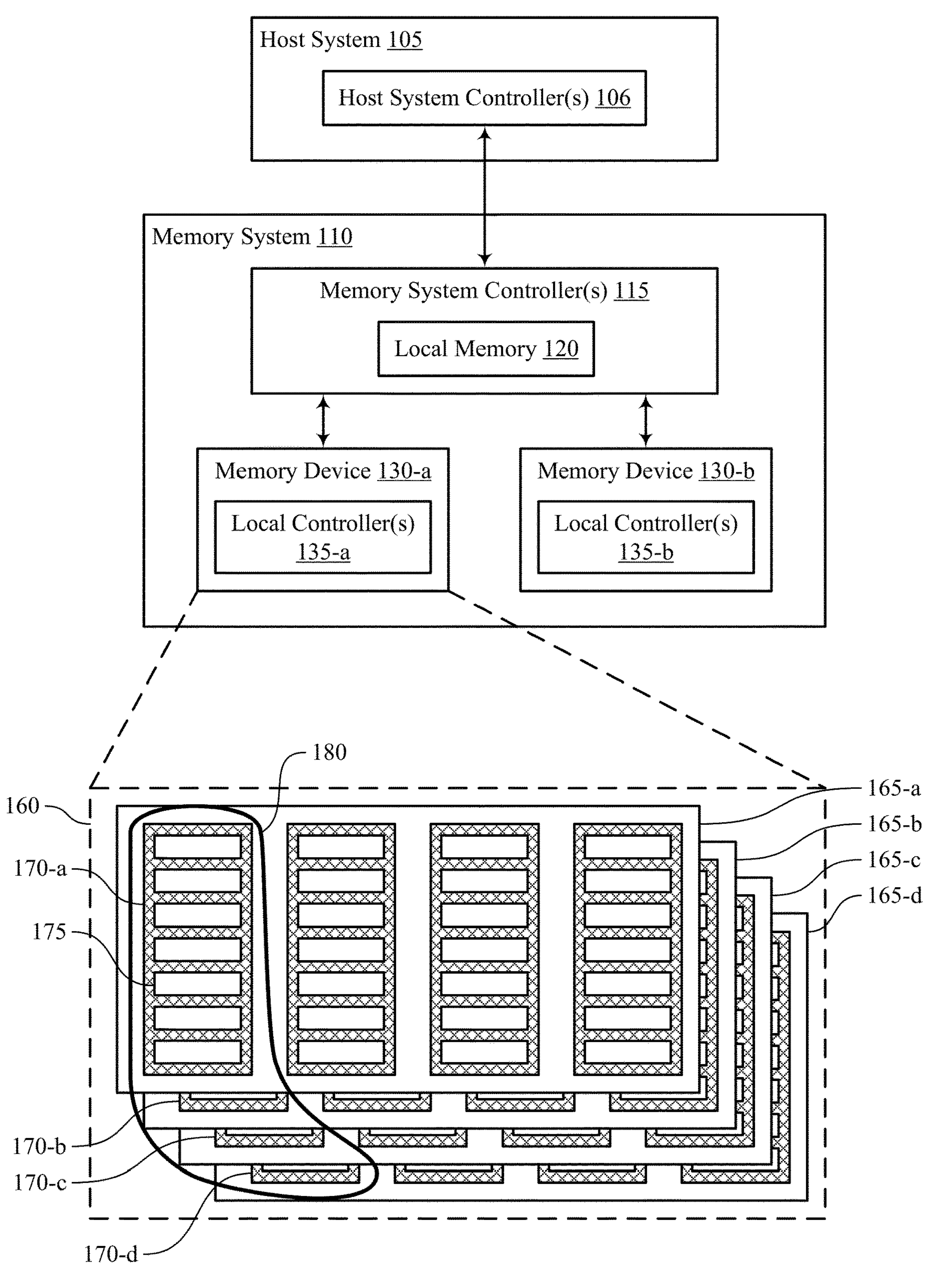
FIG. 1 illustrates an example of a system that supports efficient data management for memory system error handling in accordance with examples as disclosed herein.

A memory system may include a controller that manages one or more memory devices included in the memory system. When memory operations are performed, associated data may be passed between pages of memory (e.g., NAND pages) of the memory device and the controller via latches associated with the pages. After each data transfer has been completed, the associated latch may become available for the passing of more data between the memory device and the controller. The quantity of latches may be limited, and in certain cases (e.g., during error management), latches may become filled with data yet to be written to a page of memory, and/or with data read from a page of memory but yet to be transferred to the controller. In those cases, if another data transfer is desired to be performed (e.g., due to a new memory operation), problems may arise. If latches are unavailable, two options are available to handle the new data transfer: either the data transfer may continue by overwriting one of the latches or the data transfer may be terminated (e.g., not performed). Both of these options may cause data to be lost and the associated memory operations to become void, which may force some amount of rework by the memory system.

Techniques are described for efficient data management for memory system error handling. For example, if a new data transfer is desired between the controller and a memory device when the latches are full, the controller may obtain data that has been loaded in one of the latches, temporarily store that data in a buffer, and overwrite the latch with the new data associated with the new data transfer. After the controller is finished working with the new data now stored in the latch, the controller may restore the data from the buffer to the latch so the prior data transfer may continue. This may prevent loss of data or reduce the quantity of data that is temporarily lost from latches and needs to be re-transferred when the latches are full. Additionally or alternatively, a time for completion of memory operations may be reduced.

In addition to applicability in memory systems as described herein, techniques for improved efficient data management for memory system error handling may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more efficient data management for memory system error handling, which may decrease processing or latency times, improve response times, or otherwise improve user experience, among other benefits.

Figure 2:
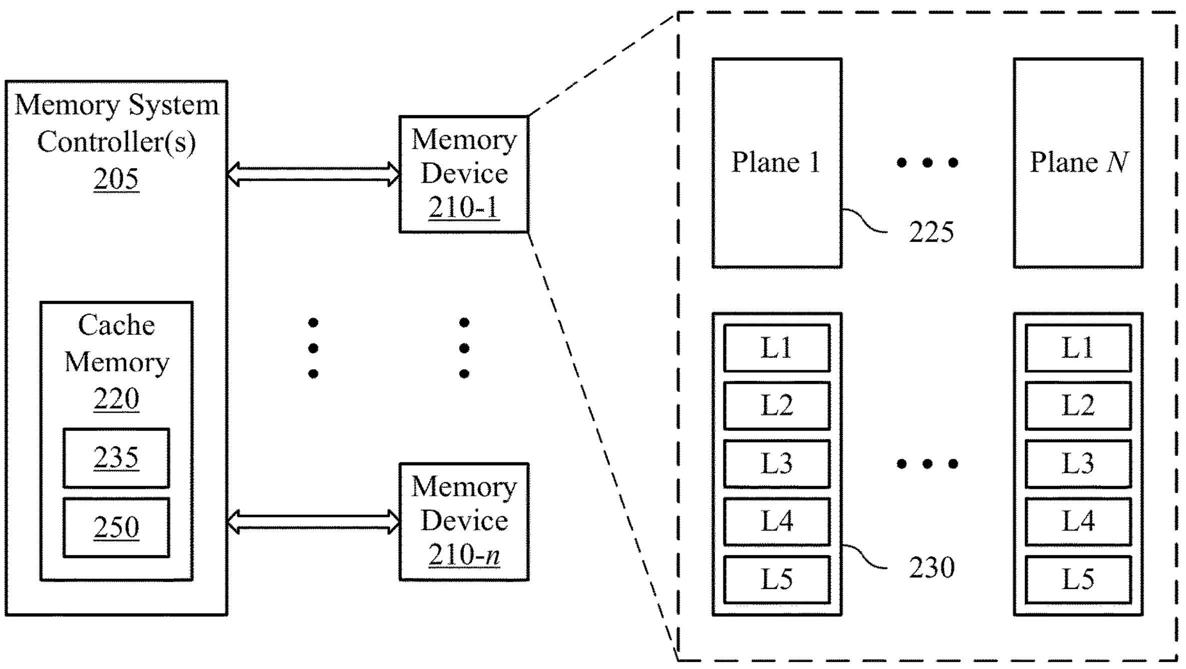
FIG. 2 illustrates an example of a system that supports efficient data management for memory system error handling in accordance with examples as disclosed herein.

Features of the disclosure are initially described in the context of systems, devices, and circuits with reference to FIGS. 1 through 2. Features of the disclosure are described in the context of process flows with reference to FIGS. 3 through 5. These and other features of the disclosure are further illustrated by and described in the context of apparatus diagrams and flowcharts that relate to efficient data management for memory system error handling with reference to FIGS. 6 through 11.

FIG. 1 illustrates an example of a system 100 that supports efficient data management for memory system error handling in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more host devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations (such as error-detecting operations or error-correcting operations), encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include random-access memory (RAM), such as static RAM (SRAM), or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 in accordance with a cache policy. Further, data received by the memory system controller 115 from the memory devices 130 or data to be written to the memory devices 130 may be temporarily stored in the local memory 120 while verification and error control of the data is performed on it.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive RAM (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs). If configured to each store three bits of information, the memory cells may be referred to as tri-level cells (TLCs). If configured to each store four bits of information, the memory cells may be referred to as quad-level cells (QLCs). More generically, the memory cells may be referred to as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170.

To avoid waiting for all of the pages 175 in a block 170 to have invalid data before erasing and reusing the block 170, an algorithm referred to as "garbage collection" may be invoked by a memory system controller 115 or a local controller 135 to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support efficient data management for memory system error handling. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

FIG. 2 illustrates an example of a memory system 200 that supports efficient data management for memory system error handling in accordance with examples as disclosed herein. The memory system 200 may be an example of a memory system 110 as described with reference to FIG. 1 or aspects thereof. The memory system 200 may include a memory system controller 205 having a cache memory 220, e.g., for temporarily storing data associated with latches of one or more memory devices 210. Memory system controller 205 may be an example of memory system controller 115 discussed with respect to FIG. 1. Cache memory 220 may be an example of or included in local memory 120 discussed with respect to FIG. 1. The memory devices 210 may be examples of the memory devices 130 discussed with respect to FIG. 1. The memory system 200 may improve performance of concurrent operations by temporarily storing data from a latch of a memory device to a buffer when the latches of the memory device are full, overwriting the latch with new data associated with a new data transfer, and restoring the data from the buffer to the latch when the new data has been used.

The memory system 200 may be configured to store data received from a host system and to send data to the host system, if requested by the host system using access commands (e.g., read commands or write commands). Accordingly, the memory system 200 may include memory devices 210 (e.g., memory device 210-1 through memory device **210-*n*) to store data transferred between the memory system 200** and the host system, e.g., in response to receiving access commands from the host system.

A memory device 210 may include N planes 225 (denoted Plane 1 through Plane N), each of which may have associated latches 230 (denoted L1 through L5). The planes 225 may be located on one or more dies of the memory device 210. The latches 230 may facilitate access operations (e.g., read operations, write operations) by storing data involved in the access operations. In some examples, one of the latches 230 for a plane 225 (e.g., latch L5, which may also be referred to as an SDC latch), may serve as a gateway latch between memory system controller 205 and the other latches for that plane (e.g., data transferred between the latches 230 and memory system controller 205 may be routed through the latch L5). Each of the latches 230 may include multiple latch circuits, each capable of storing a single bit, such that each of the latches 230 (e.g., L1 through L5) may store a quantity of bits corresponding to a page of the corresponding plane 225. The latch circuits may be implemented in the memory device as either level-triggered (e.g., transparent latches) or edge-triggered (e.g., flip-flops). Although described as having five latches 230 (e.g., L1 through L5) corresponding to each plane, some memory devices may have fewer or more latches 230 corresponding to a plane. In some cases, each memory device 210 may include m+1 latches 230 corresponding to a plane, where m may represent a quantity of bits stored in a memory cell at a highest supported density (e.g., highest quantity of bits stored in each of the multiple-level memory cells). For example, for a plane 225 having QLC memory cells, there may be five latches, and for a plane 225 having TLC memory cells, there may be four latches.

Memory system controller 205 may execute commands (e.g., access commands) received from the host system and control the movement of information (e.g., data, address mapping information) within the memory system 200. For instance, memory system controller 205 may manage the transfer of information to and from the memory devices 210, e.g., for storing information, retrieving information, and determining memory locations in which to store information and from which to retrieve information.

The cache memory 220 may store information (e.g., data) for transfer to the memory device 210 or for transfer to the host system (e.g., via a buffer 235). The cache memory 220 may also store (e.g., in another buffer 250 reserved for temporary storage of latch data) data received by memory system controller 205 from the memory devices 210 via the latches 230 of the memory devices or data to be written to the memory devices 210 via the corresponding latches 230. The buffer 250 may be different than the buffer 235 in that the buffer 250 may be used to temporarily store data that memory system controller 205 may be working on at the moment. For example, the buffer 250 may temporarily store pages of data associated with the memory devices 210 while the data is verified and while decoder operations are performed on the data before storing in the corresponding latches 230 or after receiving from the corresponding latches 230. In some examples, the buffer 250 may include a quantity of pages equal to the number of latches of the memory devices associated with memory system controller 205. The cache memory 220 may be a volatile type of memory, such as DRAM or SRAM, and may be an example of the local memory 120 described with reference to FIG. 1.

To temporarily store data (e.g., a page of data associated with a plane 225 of a memory device) in the cache memory 220, memory system controller 205 may issue a read command to a memory device 210 that indicates (e.g., identifies) a latch 230 (e.g., L5) associated with the plane 225 to which the data is to be written. If the indicated latch 230 is empty (e.g., is available to store the portion), the memory device 210 may store the data in the indicated latch and send confirmation to memory system controller 205. If the indicated latch 230 is full (e.g., is unavailable to store the data), the memory device 210 may store the data in a substitute latch (e.g., L4) associated with the plane 225 and indicate the substitute latch to memory system controller 205. Thus, memory system controller 205 may receive an indication of the latch to which the data is ultimately stored.

As discussed herein, if all of the latches associated with the plane 225 are full, memory system controller 205 may obtain a data page presently loaded in one of the latches 230 and temporarily store that data page in the buffer 250 before the memory device 210 stores the newly obtained data associated with the read command in a latch. The memory device 210 may store the newly obtained data associated with the read command in the latch 230 from which the controller obtained the other data page. After memory system controller 205 is finished working with the newly obtained data now stored in the latch 230, memory system controller 205 may restore the other data page from the buffer 250 back to the latch.

As a result, memory operations that use latches to pass data between the controller and a memory device may be performed even when all of the latches are full. Thus, the memory system 200 may prevent or reduce the quantity of data from being lost by temporarily storing data from a latch of the memory device to a buffer when the latches are full, overwriting the latch with new data associated with a new data transfer, and restoring the data from the buffer to the latch when the new data has been used. Additionally or alternatively, a time for completion of the memory operations may be reduced, as restoring the data from the buffer may have a lower latency than reading the data again from a location of the memory device 210.

In some examples, memory system controller 205 may be configured for operations associated with one or more memory devices 210. For example, memory system controller 205 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system and physical addresses (e.g., physical block addresses) associated with memory cells within the memory devices 210.

In some examples, a memory device 210 may include a single memory die. In those cases, planes 1-N may all be positioned on the same memory die. In some examples, a memory device 210 may include more than one memory die. In those cases, planes 1-N may be positioned among the memory dies such that each plane is positioned on one of the memory dies. Alternatively, instead of communicating separately with each memory device, memory system controller 205 may communicate separately with each memory die, irrespective of the number of memory dies positioned on a memory device 210. In those examples, each memory die would include its own planes 1-N.

Figure 3:
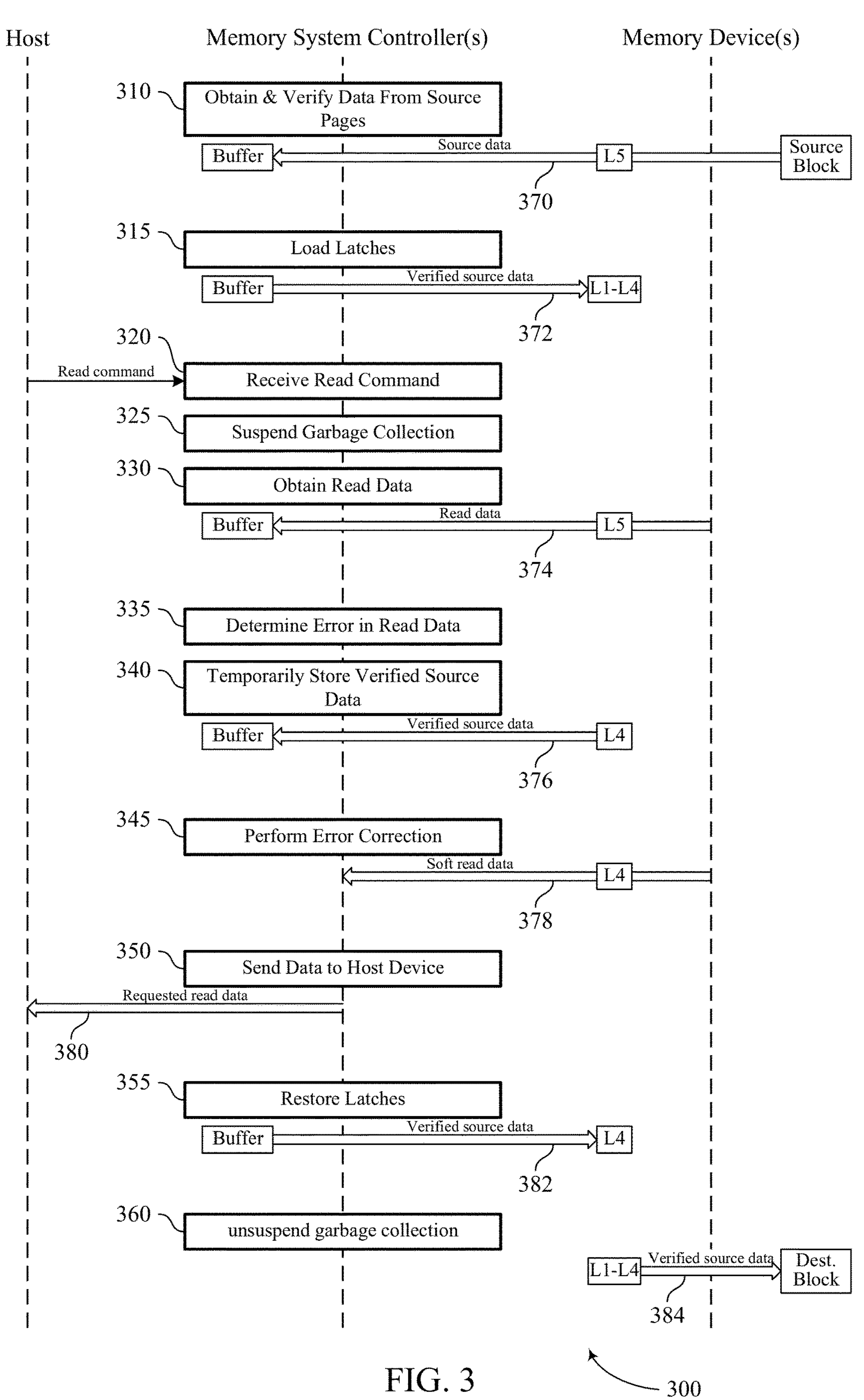
FIGS. 3 through 5 are process flow diagrams that illustrate example processes that support efficient data management for memory system error handling in accordance with examples as disclosed herein.
Figure 4:
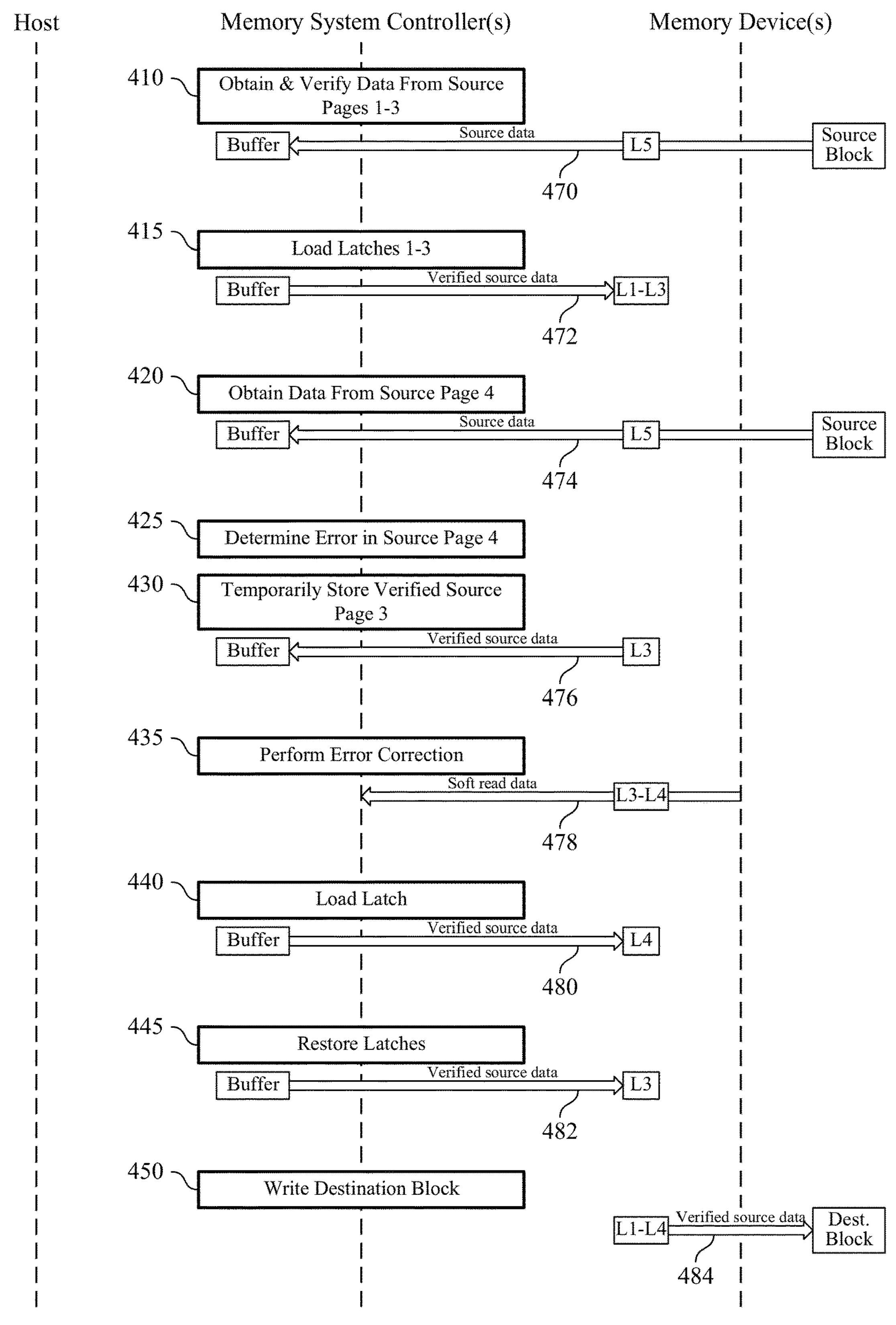
Figure 5:
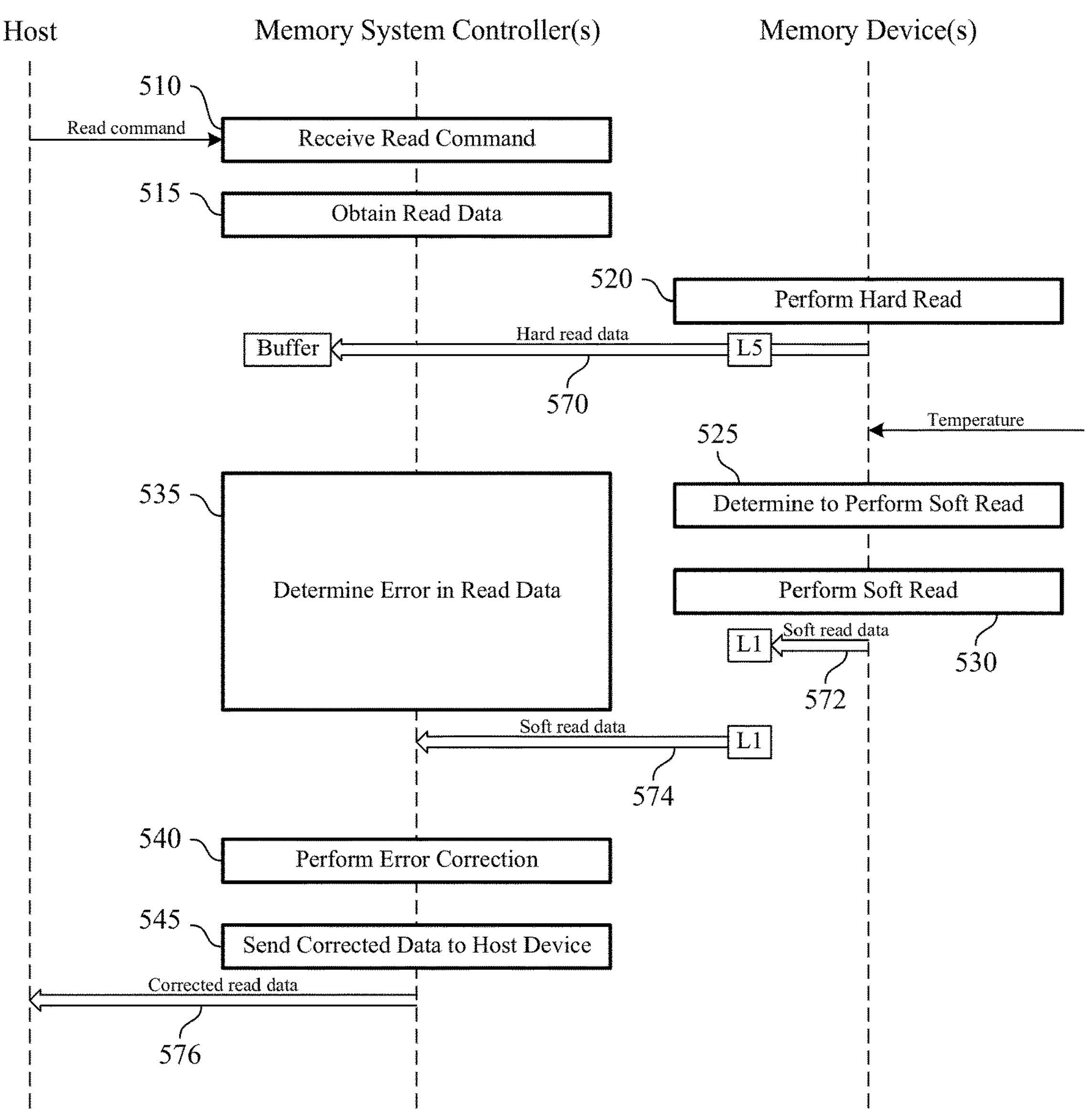

FIGS. 3-5 are process flow diagrams 300, 400, and 500 that illustrate example processes that support efficient data management for memory system error handling in accordance with examples as disclosed herein. Each process flow diagram shows steps of the process as well as data flow associated with the steps. The steps of the processes may be performed by a memory system controller (such as memory system controller 115, local controller 135, or memory system controller 205), and a memory device (such as a memory device 130 or 210), as shown. In each of process flow diagrams 300, 400, and 500, memory access operations may correspond to a single plane of the memory device and may employ a set of five latches (e.g., latches L1-L5, latches 230) associated with the plane and a buffer (e.g., buffer 250) associated with the memory system controller. In other examples, more or less than five latches may be used.

Turning to FIG. 3, process flow diagram 300 depicts an example process (with corresponding data flow) for performing an error correction procedure on data associated with a read command that interrupts a garbage collection operation associated with a QLC destination block. In the process associated with process flow diagram 300, a portion of a first operation is performed that loads original pages of data into the set of latches of the memory device. The operation is suspended by the memory system controller to perform a second operation that overwrites one of the original pages of data in the set of latches with a page of data associated with the second operation. A third operation is then performed by the memory system controller to restore the original page of data to the set of latches so that the first operation may continue (e.g., so the second portion may be performed).

At process step 310, as part of a garbage collection operation, data pages from a source block of the memory device may be obtained and verified. For example, the memory system controller may send read commands associated with four data pages of a source block to the memory device, which may obtain the corresponding four data pages from the source block and pass them to the memory system controller via one or more of the five latches, as illustrated by arrow 370. The memory system controller may temporarily store the four data pages in the buffer and use the buffer to verify that the data pages have no errors (e.g., decoding errors) (e.g., by using error control operations such as error-detecting operations or error-correcting operations). In some examples, the four data pages may be obtained and verified one at a time. That is, a single data page may be worked on by the memory system controller at a time. In those examples, each data page may be passed to the memory system controller via a same latch (e.g., latch L5, as shown) or via different latches (e.g., any of latches L1-L5).

At process step 315, the verified data pages may be loaded into the latches for programming to a destination block of the memory device. For example, as illustrated by arrow 372, the memory system controller may load the verified four data pages (e.g., from the buffer) into respective latches L1-L4 for programming to a QLC destination block of the memory device. In the examples in which a single data page may be worked on at a time, the data pages may be loaded into the respective latches one at a time.

At process step 320, a higher priority operation may be received. For example, after the four verified data pages have been loaded into the four latches, but before the verified data pages have been programmed to the destination block, the memory system controller may receive a command from the host to perform a read operation associated with the same plane as the garbage collection operation. The read operation may request a data page within the plane and have a higher priority than the garbage collection operation.

At process step 325, in response to receiving the higher priority operation, the garbage collection operation may be suspended. For example, the memory system controller may suspend the garbage collection operation by suspending the programming of the data pages within respective latches L1-L4 to the destination block, and leaving the data pages within latches L1-4. As such, latches L1-L4 may be unavailable for storing further data. As a result, latch L5 may be the only free latch (e.g., available to store data).

At process step 330, after the garbage collection operation has been suspended, the higher-priority operation may be attended to. For example, the memory system controller may send a read command associated with the requested data page to the memory device, which may obtain the requested data page. As illustrated by arrow 374, the memory device may pass the requested data page to the memory system controller via latch L5, which may be the only latch available at the time for doing so. The memory system controller may then temporarily store the requested read data page from latch L5 to the buffer. While the data pages associated with the garbage collection operation are stored within latches L1-L4 and the requested read data page is stored within latch L5, there may be no latches available for passing more data.

In some examples, when performing an access operation (e.g., the higher-priority operation), more latches may be desired to be used than are available. For example, at process step 335, while latches L1-L5 are all tied up, an error (e.g., decoder error) may be detected in the requested read data page (that has been stored in the buffer) that is not correctable using typical error correction procedures (e.g., using error control operations). The memory system controller may determine to use more data to attempt to correct the error. For example, the memory system controller may determine to use a hard read and a soft read (e.g. as part of a 1H/1S procedure) of the requested data page to help determine a corrected read data page. The soft read may be used to read the same data as the hard read using a different trim set that may provide soft information (e.g., additional information on the distributions of charge levels for memory cells for the stored data) related, e.g., to a page of data stored in multiple-level memory cells. Data associated with hard and soft reads may be passed from the memory device to the memory system controller using two or more latches. However, latches L1-L4 may be in use by the garbage collection operation (storing the four data pages to be stored to the destination block), and latch L5 may still contain the original data associated with the requested read data page, which may be used as the data page for the hard read. Because all of the latches L1-L5 may be unavailable, no latch may be free for passing the soft read data page to the memory system controller.

In some examples, one or more latches may be freed up (e.g., become available) for other uses without losing data loaded therein. For example, at process step 340, data that is loaded in one or more of the latches may be temporarily stored elsewhere to free up the latch. For example, as illustrated by arrow 376, the memory system controller may obtain the verified data page stored in latch L4 and temporarily store the data page at the memory system controller (e.g., in the buffer). While the data page is temporarily stored at the memory system controller latch L4 may be free for other uses.

With a latch now free, an operation that uses an additional latch may be performed. For example, at process step 345, in response to the memory system controller freeing up latch L4, the error correction operation may be performed (e.g., using a 1H/1S procedure). The memory system controller may send a soft read command associated with the requested data page, to the memory device, which may perform the soft read procedure (e.g., a read procedure using a different trim set) on the corresponding data page and pass the associated soft data to the memory system controller via now-free latch L4, as illustrated by arrow 378. The memory system controller may use the hard and soft data to help in determining the corrected read data page (e.g., by using both hard and soft data as part of a decoding procedure of the data page).

At process step 350, after the requested read data page has been corrected, the corrected page may be transmitted to the requester. For example, as illustrated by arrow 380, the memory system controller may transmit the corrected read data page to the host.

At process step 355, after the data from the freed-up latch has been used, the data that was previously in the latch may be restored. For example, as illustrated by arrow 382, after the soft data that was stored in latch L4 has been used to determine the corrected data page, the memory system controller may obtain the page of verified data that was temporarily stored at the memory system controller (e.g., at the buffer) and restore the page of verified data into latch L4, overwriting the soft data stored therein.

After the higher-priority access operation has been completed and the latch has been restored, the lower-priority operation may continue. For example, at process step 360, after the verified data page has been restored into latch L4, the memory system controller may unsuspend garbage collection for the plane. The memory system controller may instruct the memory device to move the data pages in the latches to the destination block. In response, as illustrated by arrow 384, the memory device may program the data pages stored in latches L1-L4 to the QLC destination block.

In an alternative example, instead of using two latches, a single latch may be used to pass both the hard and soft data to the memory system controller. For example, after the hard data associated with the 1H/1S procedure has been temporarily saved to the memory system controller (e.g., in the buffer) at process step 330, the latch used to pass the hard data (e.g., latch L5) may be available. As a result, at arrow 378, latch L5 may be used instead of latch L4 to pass the soft data to the memory system controller. As a result, none of the latches associated with the garbage collection (e.g., latches L1-L4) may be used for the error correction and those latches may retain their respective data pages. Thus, in this example, the process steps associated with temporarily storing the data pages (e.g., process step 340) and restoring the latches (e.g., process step 355) may be omitted.

In another alternative example, instead of restoring back into latch L4 a verified data page that was temporarily stored, the memory system controller can restore the source data page into latch L4 from a buffer that the memory system controller may have used to verify the source data page before the data page was originally loaded into latch L4. As a result, the process step associated with temporarily storing the data pages (e.g., process step 340) may be omitted. The buffer may still contain the verified data page, including the fourth page of data.

Turning to FIG. 4, process flow diagram 400 depicts an example process (with corresponding data flow) for performing an error correction procedure on data associated with a garbage collection operation associated with a QLC destination block. In the process associated with process flow diagram 400, a portion of an operation is performed that loads original pages of data into the set of latches of the memory device. The data from one of the latches is received by the controller and a decoding process is performed on the data. If the decoding process fails, a second operation is performed to read the page of data again and overwrite one of the original pages of data in the set of latches with the re-read data. A second decoding process is then performed by the memory system controller on the page of data using the original data and the re-read data.

At process step 410, three data pages from the source block may be obtained from the memory device via latch L5 (as illustrated by arrow 470) and verified, in a similar manner as discussed with respect to process step 310 of process flow diagram 300.

At process step 415, the three verified data pages may be loaded into respective latches L1-L3 for programming to the destination block, as illustrated by arrow 472, in a similar manner as discussed with respect to process step 315 of process flow diagram 300. Process steps 410 and 415 may be similar to process steps 310 and 315 of process flow diagram 300 except that three data pages are obtained, verified, and stored instead of four.

At process step 420, the fourth data page may be obtained from the source block. For example, the memory system controller may send a read command associated with the fourth data page to the memory device, which may obtain the corresponding data page from the source block and pass the data page to the memory system controller via latch L5, as illustrated by arrow 474. The memory system controller may temporarily store the data page in the buffer.

At process step 425, an error (e.g., decoding error) may be detected in the fourth data page that is not correctable using typical error correction procedures (e.g., using error control operations) and a further error correction procedure may be used. For example, the memory system controller may determine to use a hard read and two soft reads (e.g., a 1H/2S procedure) of the fourth data page to attempt to correct the error. Although one latch may be free (e.g. latch L4) for passing data associated with one of the soft reads to the memory system controller, a second latch may not be free for passing data associated with the other soft read.

At process step 430, one or more latches may be freed up by temporarily moving the data therein to other storage. For example, as illustrated by arrow 476, the memory system controller may obtain the verified data page stored in latch L3 and temporarily store the data page at the memory system controller (e.g., in the buffer). Process step 430 may be similar to process step 340 of process flow diagram 300.

At process step 435, after the one or more latches have been freed up, the further error correction operation may be performed (e.g., the 1H/2S operation). For example, the memory system controller may send a pair of soft read commands associated with the requested data page to the memory device, which may perform the soft read procedures on the corresponding data page and pass the associated soft data to the memory system controller via latches L3 and L4, as illustrated by arrow 478. The memory system controller may use the hard and soft data associated with latches L3-L5 to help in determining the corrected fourth data page.

At process step 440, after the fourth data page has been corrected, it may be loaded into the latches. For example, as illustrated by arrow 480, the memory system controller may load the corrected fourth data page into latch L4.

At process step 445, after the data from the one or more freed-up latches have been used, the data that was previously in the latches may be restored into them. For example, as illustrated by arrow 482, after the soft data that was stored in latch L3 has been used to determine the corrected fourth data page, the memory system controller may obtain the page of verified data that was temporarily stored at the controller (e.g., at the buffer) and restored it into latch L3. Process step 445 may be similar to process step 355 of process flow diagram 300.

At process step 450, after the latches have been restored, the data in the latches may be written to the destination block. For example, as illustrated by arrow 484, the memory device may program the data pages in latches L1-L4 to the QLC destination block in response to an instruction from the memory system controller to do so. Process step 450 may be similar to process step 360 of process flow diagram 300.

Turning to FIG. 5, process flow diagram 500 depicts an example process (with corresponding data flow) for performing a preventive error correction procedure by the memory device. In the process associated with process flow diagram 500, a command to read a page of data is received by the memory device. In response, a first (e.g., hard) read and a second (e.g., soft) read are performed on the same page (e.g., the page of data is read twice from the memory) to obtain two sets of bit values corresponding to the same data. The sets of bit values corresponding to both reads are output by the memory device to different latches.

At process step 510, a read command may be received. For example, the memory system controller may receive a command from the host to perform a read operation.

At process step 515, in response to receiving the read command, data associated with the read command may be obtained by the memory system controller. For example, the memory system controller may send a read command associated with the requested data page to the memory device.

At process step 520, in response to the read command, the corresponding data page may be obtained by the memory device and provided to the memory system controller. For example, the memory device may perform a hard read procedure to obtain the data page and pass it to the memory system controller via latch L5, as illustrated by arrow 570. The memory system controller may store the data page from latch L5 to the buffer.

At process step 525, also in response to the memory device receiving the read command, a determination may be made by the memory device as to whether to perform a preventive error correction procedure. For example, a temperature of the memory device may be used to determine whether a soft read is to be performed. The memory device may obtain an indication of a temperature of the memory device or a portion thereof and may compare the indication of the temperature to a threshold value. If the indication of the temperature satisfies the threshold value, the memory device may automatically (e.g., without being commanded by the host or the memory system controller) perform a soft read procedure (process step 530) associated with the read data.

At process step 530, in response to the indication of the temperature satisfying the threshold value, a soft read procedure may automatically be performed by the memory device. For example, the memory device may perform a soft read procedure associated with the data read by the previous read command without having received a new read command. As illustrated by arrow 572, the memory device may load the associated soft read data in a different latch (e.g., latch L1) than the latch that holds the hard read data, for passing to the memory system controller. If the indication of the temperature fails to satisfy the threshold value, the memory device may omit performing the soft read procedure associated with the read data. In some cases, performing the soft read procedure at process step 530 may occur at least partially concurrently with outputting the data of the data page to the memory system controller. For example, the soft read procedure may be initiated prior to completion of output of the data of the data page to the memory system controller at 570.

Meanwhile, at process step 535, after the memory system controller obtains the requested read data page (at 570), an error (e.g., decoding error) may be detected in the data page that is not correctable using typical error correction procedures (e.g., using error control operations), and the memory system controller may determine to use a soft read of the data page to attempt to correct the error. In some examples, process step 535 may be performed concurrent with process steps 525 and 530. For example, the memory system controller may determine the error in the read data concurrent with the memory device determining to perform the soft read and then performing the soft read. This may save a significant amount of time. And because the memory device may automatically perform the soft read procedure, a command to the memory device to perform the soft read procedure may be omitted, which may also save a significant amount of time.

As illustrated by arrow 574, upon detecting the error and determining to use the soft read procedure, the memory system controller may obtain the soft read data associated with the soft read procedure from latch L1. Because the soft read procedure may be performed by the memory device concurrent with the memory system controller determining the error in the read data, the soft read data associated with the soft read procedure may already be loaded into latch L1 for the memory system controller to obtain. As a result, the soft read data may be ready for the memory system controller to use more quickly than if the memory device had waited to perform the soft read until the memory system controller had commanded the memory device to do so. This may save a significant amount of time.

At process step 540, the memory system controller may use the hard and soft data respectively stored in latches L5 and L1 to help determine the corrected data page.

At process step 545, the corrected data page may be transmitted to the requester. For example, as illustrated by arrow 576, the memory system controller may transmit the corrected read data page to the host.

In some examples, the memory device may perform a soft read every time it performs a hard read. In those cases, process step 525 may be omitted.

As discussed above, process steps 510, 515, 535, 540, and 545 may be performed by the memory system controller and process steps 520, 525, and 530 may be performed by the memory device. In some examples, the process steps performed by the memory system controller may be considered a separate process than the process steps performed by the memory device.

Figure 6:
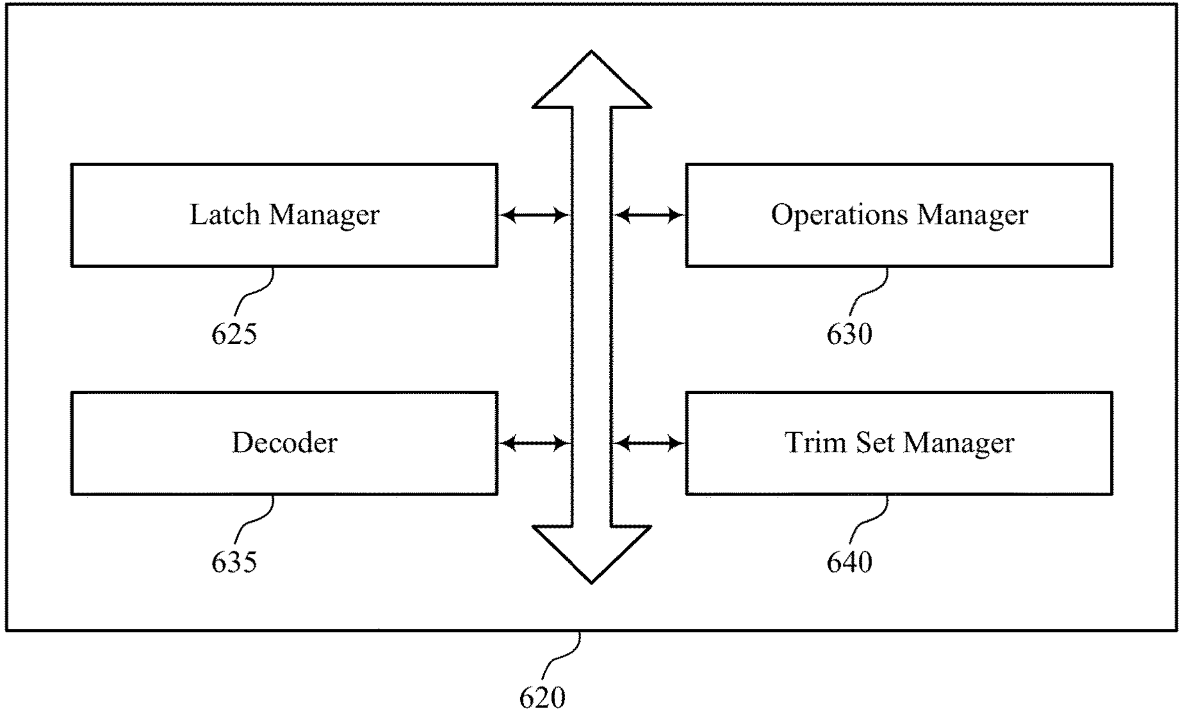
FIG. 6 illustrates a block diagram of a memory system that supports efficient data management for memory system error handling in accordance with examples as disclosed herein.

FIG. 6 illustrates a block diagram 600 of a memory system 620 that supports efficient data management for memory system error handling in accordance with examples as disclosed herein. The memory system 620 may be an example of aspects of a memory system as described with reference to FIGS. 1 through 5. The memory system 620, or various components thereof, may be an example of means for performing various aspects of efficient data management for memory system error handling as described herein. For example, the memory system 620 may include a latch manager 625, an operations manager 630, a decoder 635, a trim set manager 640, or any combination thereof. Each of these components may communicate, directly or indirectly, with one another (e.g., via one or more buses). In some examples, the latch manager 625, the operations manager 630, the decoder 635, the trim set manager 640, or any combination thereof, may collectively comprise a controller, (e.g., memory system controller 205).

The latch manager 625 may be configured as or otherwise support a means for performing, by a controller, a first portion of a first operation on a memory device, where the first portion of the first operation loads a plurality of pages of data into a first subset of a set of latches of the memory device. The operations manager 630 may be configured as or otherwise support a means for suspending the first operation based at least in part on determining to perform a second operation on the memory device that utilizes a second subset of the set of latches. In some examples, the latch manager 625 may be configured as or otherwise support a means for performing the second operation on the memory device, where performing the second operation includes overwriting first data in at least one of the first subset of the set of latches with second data associated with the second operation. In some examples, the latch manager 625 may be configured as or otherwise support a means for performing a third operation on the memory device, where the third operation restores the first data to the at least one of the first subset of the set of latches.

In some examples, performing the first portion of the first operation includes loading a plurality of pages of data into respective latches for writing to a destination block of memory.

In some examples, the operations manager 630 may be configured as or otherwise support a means for performing a second portion of the first operation on the memory device after performing the third operation that restores the first data to the at least one of the first subset of the set of latches.

In some examples, the second portion of the first operation includes programming a plurality of pages of a destination block with a plurality of pages of data loaded in respective latches.

In some examples, performing the first portion of the first operation may include reading the plurality of pages of data from a first address of the memory device into the first subset of the set of latches. In some examples, performing the third operation may include reading the first data from the first address of the memory device.

In some examples, the latch manager 625 may be configured as or otherwise support a means for reading the first data from the at least one of the first subset of the set of latches into a buffer of the controller before performing the second operation. In some examples, performing the third operation may include writing the first data from the buffer to the at least one of the first subset of the set of latches.

In some examples, the plurality of pages of data may correspond to memory pages of multi-level memory cells of the memory device.

In some examples, the first operation may be part of a garbage collection operation. In some examples, the first operation may be part of a program operation for multi-level cells of the memory device.

In some examples, the second operation may be associated with a read command received from a host system. In some examples, performing the second operation may include performing a plurality of read operations for a page of the memory device. In some examples, at least one of the plurality of read operations for the page may be associated with obtaining soft information for the page.

In some examples, the latch manager 625 may be configured as or otherwise support a means for performing, by a controller, a first portion of a first operation on a memory device, where the first portion of the first operation loads a plurality of pages of data from the memory device into respective latches of the memory device. In some examples, the latch manager 625 may be configured as or otherwise support a means for receiving, by the controller from one of the respective latches, first data associated with a first page of the plurality of pages of data. The decoder 635 may be configured as or otherwise support a means for performing a first decoding process on the first data. In some examples, the latch manager 625 may be configured as or otherwise support a means for performing a second operation on the memory device to read second data associated with the first page into at least one latch of the respective latches based at least in part on a decoding failure of the first decoding process, where performing the second operation overwrites data loaded in the at least one latch with the second data. In some examples, the decoder 635 may be configured as or otherwise support a means for performing a second decoding process on the first page using the first data and the second data.

In some examples, the latch manager 625 may be configured as or otherwise support a means for restoring the overwritten data back into the at least one latch after performing the second decoding process.

In some examples, the second portion of the first operation may include programming a plurality of pages of a destination block with the plurality of pages of data loaded in the respective latches.

In some examples, the latch manager 625 may be configured as or otherwise support a means for reading the data from the at least one latch into a buffer of the controller before performing the second decoding operation. In some examples, the latch manager 625 may be configured as or otherwise support a means for restoring the at least one latch with the data from the buffer after performing the second decoding process.

In some examples, the trim set manager 640 may be configured as or otherwise support a means for changing, after performing the first operation, a parameter associated with a trim set associated with the first page, where performing the second operation is based at least in part on changing the parameter.

In some examples, the second data includes soft information associated with the first page.

In some examples, the first operation is part of a program operation for multi-level cells of the memory device. In some examples, the first operation is part of a garbage collection operation.

In some examples, the operations manager 630 may be configured as or otherwise support a means for determining, by a controller, to perform a plurality of operations on a memory device, where each operation of the plurality of operations includes reading a plurality of pages of data from a respective source location of a plurality of source locations and writing the plurality of pages to a respective destination location of a plurality of destination locations. In some examples, the decoder 635 may be configured as or otherwise support a means for determining, while performing a first operation of the plurality of operations, that the first operation is being performed at least partially concurrently with a second operation on the memory device and that a decoding error has occurred for at least one of the plurality of pages. In some examples, the operations manager 630 may be configured as or otherwise support a means for suspending the first operation. In some examples, the operations manager 630 may be configured as or otherwise support a means for performing a third operation of the plurality of operations at least partially concurrently with the second operation. In some examples, the operations manager 630 may be configured as or otherwise support a means for performing the first operation after completion of the second operation.

In some examples, suspending the first operation may be based at least in part on determining that a first set of pages associated with the first operation occupy a first subset of a plurality of latches of the memory device and that a second set of pages associated with the second operation occupy a second, remaining subset of the plurality of latches.

In some examples, the first operation may be associated with a first source location of the plurality of source locations and the third operation may be associated with a second source location of the plurality of source locations.

In some examples, the plurality of source locations may be within a source block and the plurality of destination locations may be within a destination block.

In some examples, the plurality of operations may include a garbage collection operation for multi-level cells of the memory device.

Figure 7:
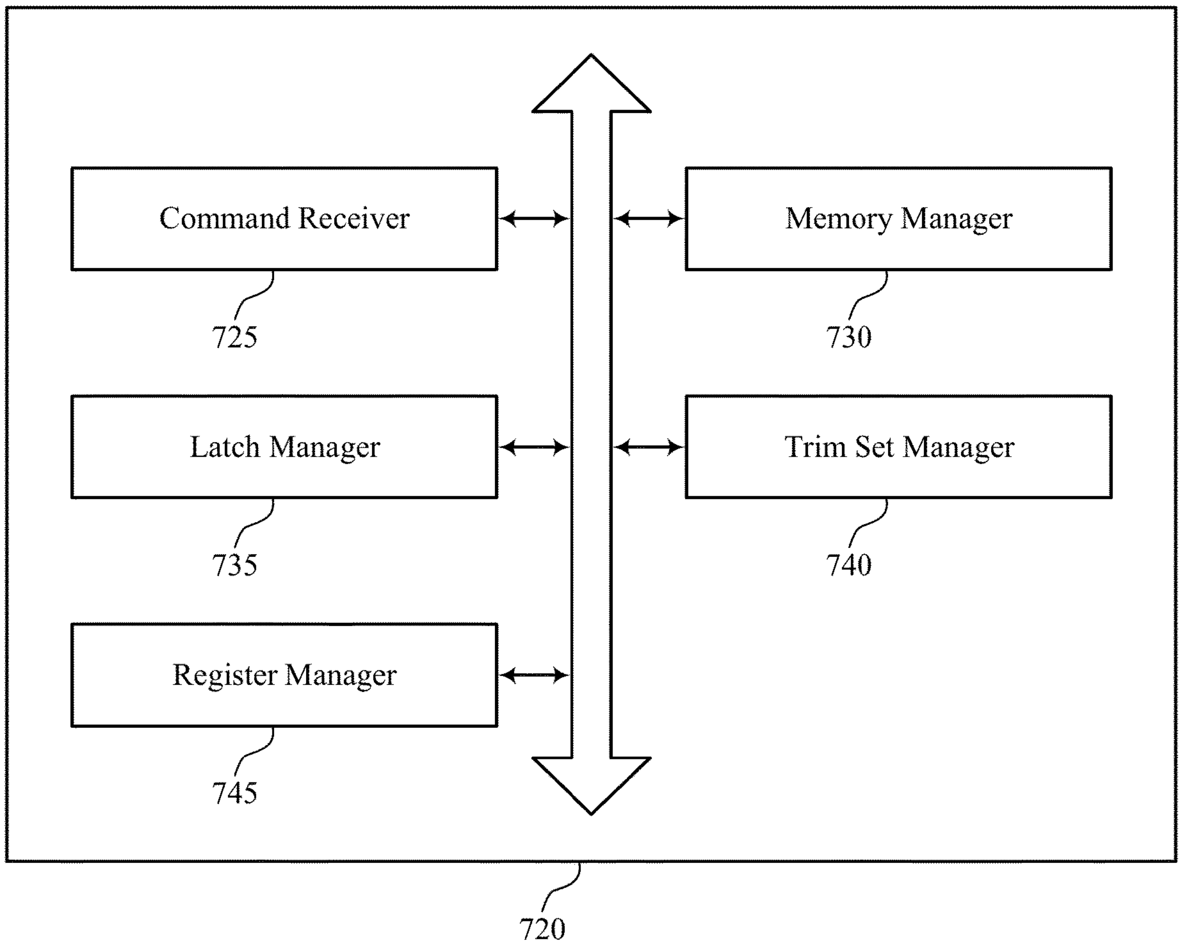
FIG. 7 illustrates a block diagram of a memory device that supports efficient data management for memory system error handling in accordance with examples as disclosed herein.

FIG. 7 illustrates a block diagram 700 of a memory device 720 that supports efficient data management for memory system error handling in accordance with examples as disclosed herein. The memory device 720 may be an example of aspects of a memory device as described with reference to FIGS. 1 through 5. The memory device 720, or various components thereof, may be an example of means for performing various aspects of efficient data management for memory system error handling as described herein. For example, the memory device 720 may include a command receiver 725, a memory manager 730, a latch manager 735, a trim set manager 740, a register manager 745, or any combination thereof. Each of these components may communicate, directly or indirectly, with one another (e.g., via one or more buses).

The command receiver 725 may be configured as or otherwise support a means for receiving, by a memory device, a first command to read a page of the memory device. The memory manager 730 may be configured as or otherwise support a means for performing, based at least in part on receiving the first command, a first read operation on the page of the memory device to obtain a first set of bit values associated with the page. The latch manager 735 may be configured as or otherwise support a means for outputting the first set of bit values associated with the page to a first latch. In some examples, the memory manager 730 may be configured as or otherwise support a means for performing, based at least in part on receiving the first command, a second read operation on the page of the memory device to obtain a second set of bit values associated with the page. In some examples, the latch manager 735 may be configured as or otherwise support a means for outputting the second set of bit values associated with the page to a second latch.

In some examples, the second read operation on the page may be associated with obtaining soft information for the page.

In some examples, performing the second read operation may occur at least partially concurrently with outputting the first set of bit values to the first latch.

In some examples, performing the second read operation is based at least in part on a condition of the memory device. In some examples, the condition includes a temperature of the memory device satisfying a threshold.

In some examples, the register manager 745 may be configured as or otherwise support a means for setting a flag in a register based at least in part on the condition of the memory device.

In some examples, performing the second read operation may be based at least in part on an indicator in the first command.

In some examples, the trim set manager 740 may be configured as or otherwise support a means for changing, after performing the first read operation, a parameter associated with a trim set associated with the page, where performing the second read operation is based at least in part on changing the parameter.

Figure 8:
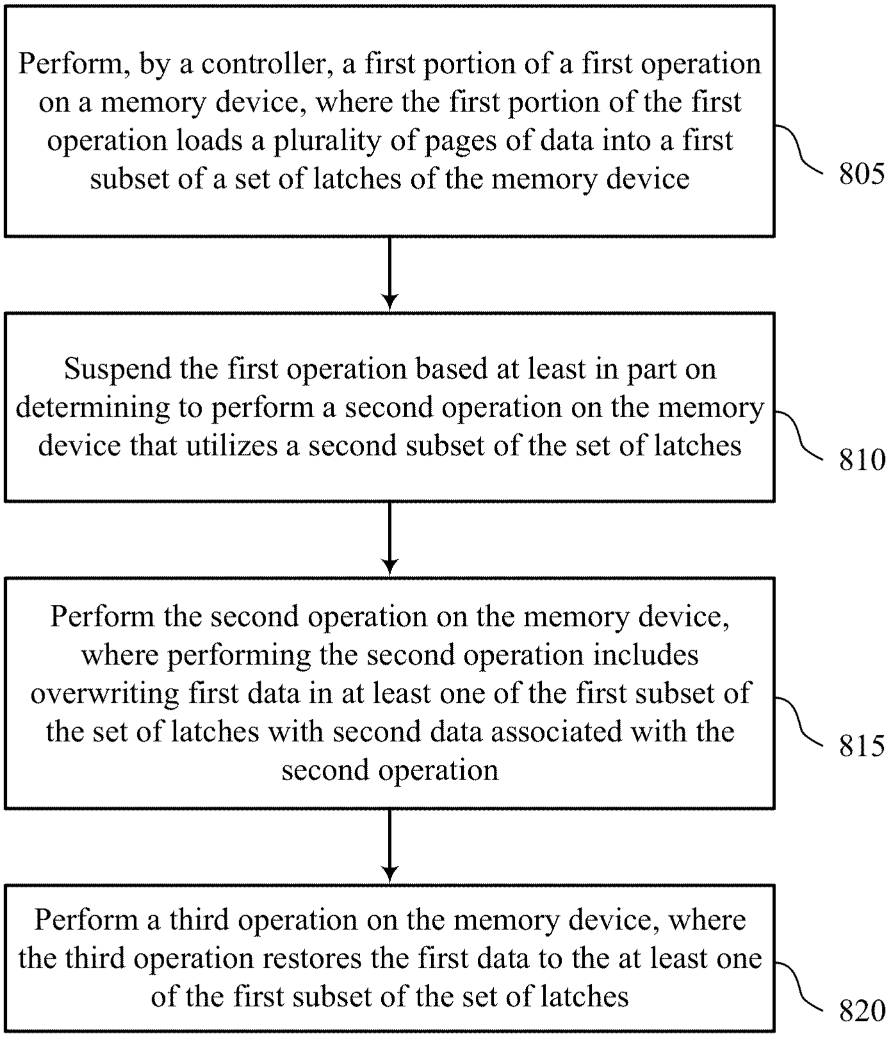
FIGS. 8 through 11 illustrate flowcharts showing methods that support efficient data management for memory system error handling in accordance with examples as disclosed herein.

FIG. 8 illustrates a flowchart showing a method 800 that supports efficient data management for memory system error handling in accordance with examples as disclosed herein. The operations of method 800 may be implemented by a memory system or its components (e.g., a controller) as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include performing, by a controller, a first portion of a first operation on a memory device, where the first portion of the first operation loads a plurality of pages of data into a first subset of a set of latches of the memory device. The operations of 805 may be performed in accordance with examples as disclosed herein. In some examples, aspects of the operations of 805 may be performed by a latch manager 625 as described with reference to FIG. 6.

At 810, the method may include suspending the first operation based at least in part on determining to perform a second operation on the memory device that utilizes a second subset of the set of latches. The operations of 810 may be performed in accordance with examples as disclosed herein. In some examples, aspects of the operations of 810 may be performed by an operations manager 630 as described with reference to FIG. 6.

At 815, the method may include performing the second operation on the memory device, where performing the second operation includes overwriting first data in at least one of the first subset of the set of latches with second data associated with the second operation. The operations of 815 may be performed in accordance with examples as disclosed herein. In some examples, aspects of the operations of 815 may be performed by a latch manager 625 as described with reference to FIG. 6.

At 820, the method may include performing a third operation on the memory device, where the third operation restores the first data to the at least one of the first subset of the set of latches. The operations of 820 may be performed in accordance with examples as disclosed herein. In some examples, aspects of the operations of 820 may be performed by a latch manager 625 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, by a controller, a first portion of a first operation on a memory device, where the first portion of the first operation loads a plurality of pages of data into a first subset of a set of latches of the memory device; suspending the first operation based at least in part on determining to perform a second operation on the memory device that utilizes a second subset of the set of latches; performing the second operation on the memory device, where performing the second operation includes overwriting first data in at least one of the first subset of the set of latches with second data associated with the second operation; and performing a third operation on the memory device, where the third operation restores the first data to the at least one of the first subset of the set of latches.

Aspect 2: The method, apparatus, or non-transitory computer-readable medium of aspect 1, where performing the first portion of the first operation includes loading a plurality of pages of data into respective latches for writing to a destination block of memory.

Aspect 3: The method, apparatus, or non-transitory computer-readable medium of any of aspects 1 through 2, further including operations, features, circuitry, logic, means, or instructions, or any combination thereof for performing a second portion of the first operation on the memory device after performing the third operation that restores the first data to the at least one of the first subset of the set of latches.

Aspect 4: The method, apparatus, or non-transitory computer-readable medium of aspect 3, where the second portion of the first operation includes programming a plurality of pages of a destination block with a plurality of pages of data loaded in respective latches.

Aspect 5: The method, apparatus, or non-transitory computer-readable medium of any of aspects 1 through 4, where performing the first portion of the first operation includes reading the plurality of pages of data from a first address of the memory device into the first subset of the set of latches and performing the third operation includes reading the first data from the first address of the memory device.

Aspect 6: The method, apparatus, or non-transitory computer-readable medium of any of aspects 1 through 5, further including operations, features, circuitry, logic, means, or instructions, or any combination thereof for reading the first data from the at least one of the first subset of the set of latches into a buffer of the controller before performing the second operation and where performing the third operation includes writing the first data from the buffer to the at least one of the first subset of the set of latches.

Aspect 7: The method, apparatus, or non-transitory computer-readable medium of any of aspects 1 through 6, where the plurality of pages of data correspond to pages of multi-level memory cells of the memory device.

Aspect 8: The method, apparatus, or non-transitory computer-readable medium of any of aspects 1 through 7, where the second operation is associated with a read command received from a host system.

Aspect 9: The method, apparatus, or non-transitory computer-readable medium of any of aspects 1 through 8, where performing the second operation includes performing a plurality of read operations for a page of the memory device.

Aspect 10: The method, apparatus, or non-transitory computer-readable medium of aspect 9, where at least one of the plurality of read operations for the page is associated with obtaining soft information for the page.

Aspect 11: The method, apparatus, or non-transitory computer-readable medium of any of aspects 1 through 10, where the first operation is part of a garbage collection operation.

Aspect 12: The method, apparatus, or non-transitory computer-readable medium of any of aspects 1 through 11, where the first operation is part of a program operation for multi-level cells of the memory device.

Figure 9:
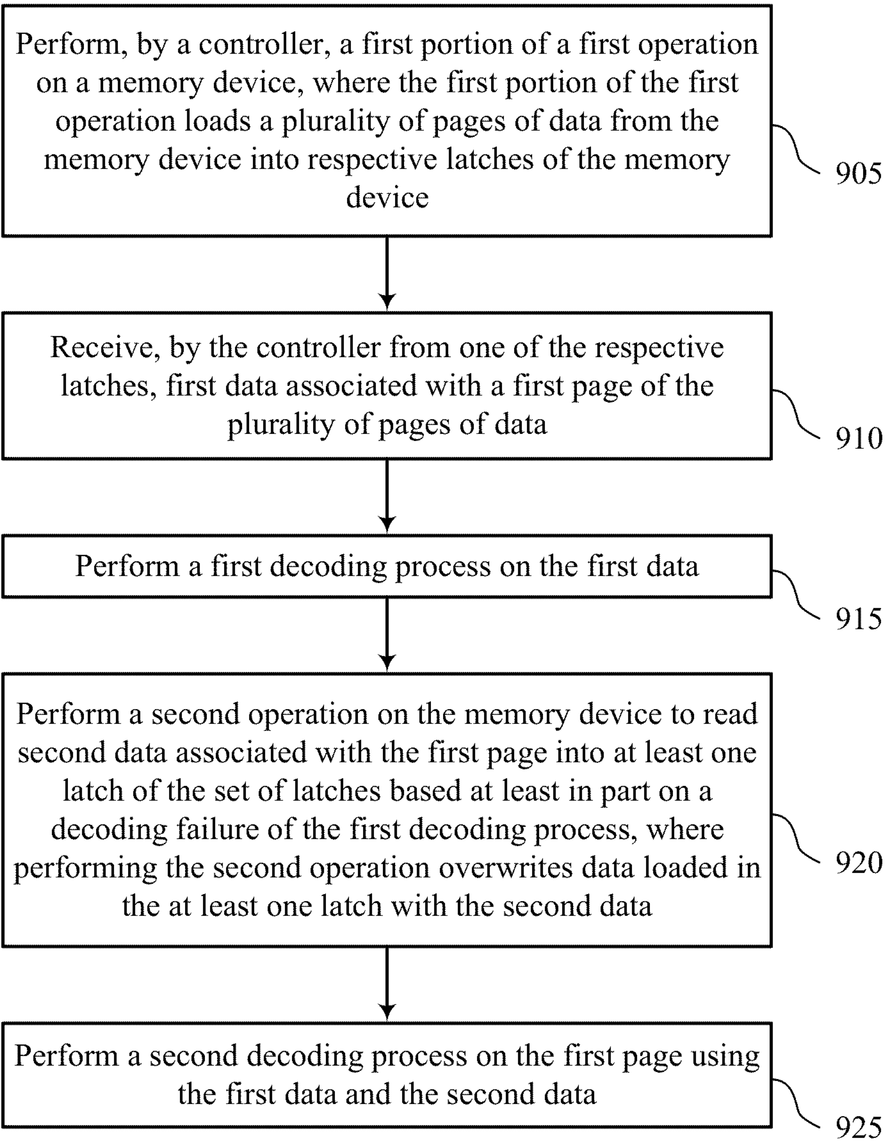

FIG. 9 illustrates a flowchart showing a method 900 that supports efficient data management for memory system error handling in accordance with examples as disclosed herein. The operations of method 900 may be implemented by a memory system or its components as described herein. For example, the operations of method 900 may be performed by a memory system (e.g., a controller) as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 905, the method may include performing, by a controller, a first portion of a first operation on a memory device, where the first portion of the first operation loads a plurality of pages of data from the memory device into respective latches of the memory device. The operations of 905 may be performed in accordance with examples as disclosed herein. In some examples, aspects of the operations of 905 may be performed by a latch manager 625 as described with reference to FIG. 6.

At 910, the method may include receiving, by the controller from one of the respective latches, first data associated with a first page of the plurality of pages of data. The operations of 910 may be performed in accordance with examples as disclosed herein. In some examples, aspects of the operations of 910 may be performed by a latch manager 625 as described with reference to FIG. 6.

At 915, the method may include performing a first decoding process on the first data. The operations of 915 may be performed in accordance with examples as disclosed herein. In some examples, aspects of the operations of 915 may be performed by a decoder 635 as described with reference to FIG. 6.

At 920, the method may include performing a second operation on the memory device to read second data associated with the first page into at least one latch of the respective latches based at least in part on a decoding failure of the first decoding process, where performing the second operation overwrites data loaded in the at least one latch with the second data. The operations of 920 may be performed in accordance with examples as disclosed herein. In some examples, aspects of the operations of 920 may be performed by a latch manager 625 as described with reference to FIG. 6.

At 925, the method may include performing a second decoding process on the first page using the first data and the second data. The operations of 925 may be performed in accordance with examples as disclosed herein. In some examples, aspects of the operations of 925 may be performed by a decoder 635 as described with reference to FIG. 6.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for performing, by a controller, a first portion of a first operation on a memory device, where the first portion of the first operation loads a plurality of pages of data from the memory device into respective latches of the memory device; receiving, by the controller from one of the respective latches, first data associated with a first page of the plurality of pages of data; performing a first decoding process on the first data; performing a second operation on the memory device to read second data associated with the first page into at least one latch of the respective latches based at least in part on a decoding failure of the first decoding process, where performing the second operation overwrites data loaded in the at least one latch with the second data; and performing a second decoding process on the first page using the first data and the second data.

Aspect 14: The method, apparatus, or non-transitory computer-readable medium of aspect 13, further including operations, features, circuitry, logic, means, or instructions, or any combination thereof for restoring the overwritten data back into the at least one latch after performing the second decoding process.

Aspect 15: The method, apparatus, or non-transitory computer-readable medium of aspect 14, further including operations, features, circuitry, logic, means, or instructions, or any combination thereof for performing a second portion of the first operation on the memory device after restoring the overwritten data back into to the at least one latch.

Aspect 16: The method, apparatus, or non-transitory computer-readable medium of aspect 15, where the second portion of the first operation comprises programming a plurality of pages of a destination block with the plurality of pages of data loaded in the respective latches.

Aspect 17: The method, apparatus, or non-transitory computer-readable medium of aspects 13 through 16, further including operations, features, circuitry, logic, means, or instructions, or any combination thereof for reading the data from the at least one latch into a buffer of the controller before performing the second decoding operation and restoring the at least one latch with the data from the buffer after performing the second decoding process.

Aspect 18: The method, apparatus, or non-transitory computer-readable medium of aspects 13 through 17, further including operations, features, circuitry, logic, means, or instructions, or any combination thereof for changing, after performing the first operation, a parameter associated with a trim set associated with the first page, wherein performing the second operation is based at least in part on changing the parameter.

Aspect 19: The method, apparatus, or non-transitory computer-readable medium of any of aspects 13 through 18, where the second data includes soft information associated with the first page.

Aspect 20: The method, apparatus, or non-transitory computer-readable medium of any of aspects 13 through 19, where the first operation is part of a program operation for multi-level cells of the memory device.

Aspect 21: The method, apparatus, or non-transitory computer-readable medium of any of aspects 13 through 20, where the first operation is part of a garbage collection operation.

Figure 10:
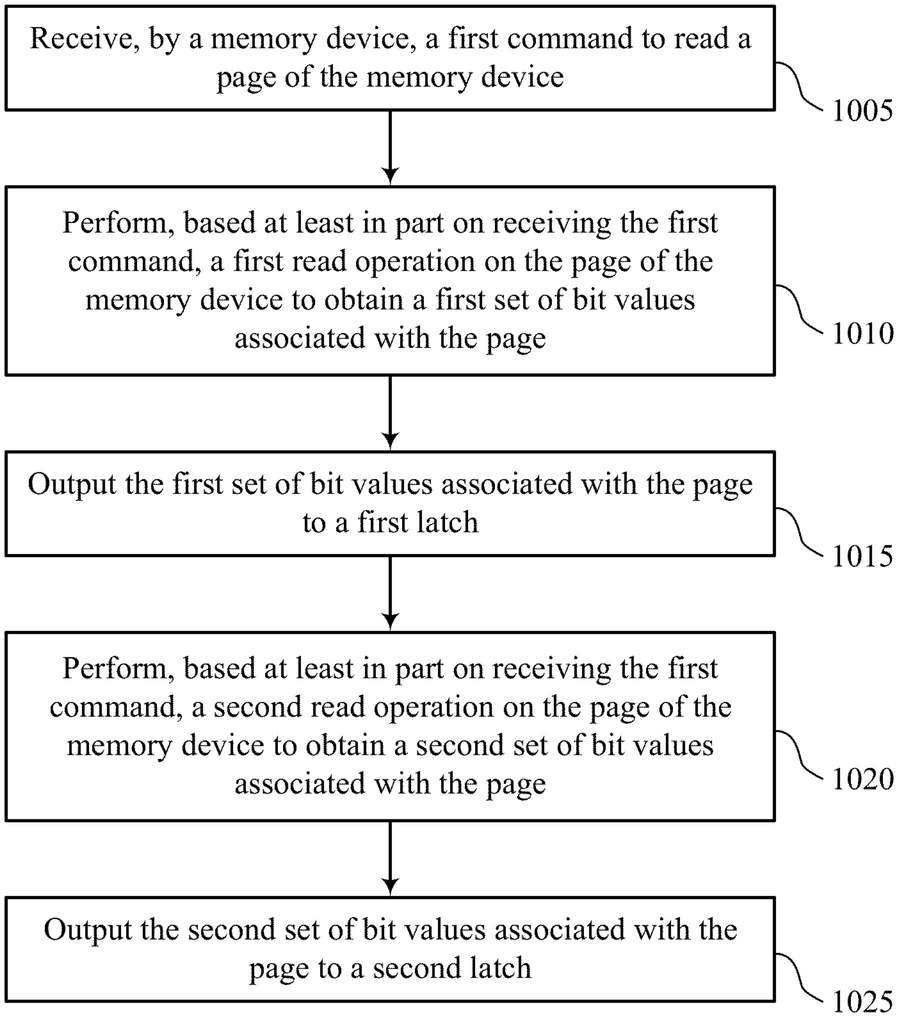

FIG. 10 illustrates a flowchart showing a method 1000 that supports efficient data management for memory system error handling in accordance with examples as disclosed herein. The operations of method 1000 may be implemented by a memory device or its components as described herein. For example, the operations of method 1000 may be performed by a memory device as described with reference to FIGS. 1 through 5 and 7. In some examples, a memory device may execute a set of instructions to control the functional elements of the device to perform the described functions. Additionally, or alternatively, the memory device may perform aspects of the described functions using special-purpose hardware.

At 1005, the method may include receiving, by a memory device, a first command to read a page of the memory device. The operations of 1005 may be performed in accordance with examples as disclosed herein. In some examples, aspects of the operations of 1005 may be performed by a command receiver 725 as described with reference to FIG. 7.

At 1010, the method may include performing, based at least in part on receiving the first command, a first read operation on the page of the memory device to obtain a first set of bit values associated with the page. The operations of 1010 may be performed in accordance with examples as disclosed herein. In some examples, aspects of the operations of 1010 may be performed by a memory manager 730 as described with reference to FIG. 7.

At 1015, the method may include outputting the first set of bit values associated with the page to a first latch. The operations of 1015 may be performed in accordance with examples as disclosed herein. In some examples, aspects of the operations of 1015 may be performed by a latch manager 735 as described with reference to FIG. 7.

At 1020, the method may include performing, based at least in part on receiving the first command, a second read operation on the page of the memory device to obtain a second set of bit values associated with the page. The operations of 1020 may be performed in accordance with examples as disclosed herein. In some examples, aspects of the operations of 1020 may be performed by a memory manager 730 as described with reference to FIG. 7.

At 1025, the method may include outputting the second set of bit values associated with the page to a second latch. The operations of 1025 may be performed in accordance with examples as disclosed herein. In some examples, aspects of the operations of 1025 may be performed by a latch manager 735 as described with reference to FIG. 7.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 22: A method, apparatus, or non-transitory computer-readable medium including operations, features, circuitry, logic, means, or instructions, or any combination thereof for receiving, by a memory device, a first command to read a page of the memory device; performing, based at least in part on receiving the first command, a first read operation on the page of the memory device to obtain a first set of bit values associated with the page; outputting the first set of bit values associated with the page to a first latch; performing, based at least in part on receiving the first command, a second read operation on the page of the memory device to obtain a second set of bit values associated with the page; and outputting the second set of bit values associated with the page to a second latch.

Aspect 23: The method, apparatus, or non-transitory computer-readable medium of aspect 22, where the second read operation on the page is associated with obtaining soft information for the page.

Aspect 24: The method, apparatus, or non-transitory computer-readable medium of any of aspects 22 through 23, where performing the second read operation occurs at least partially concurrently with outputting the first set of bit values to the first latch.

Aspect 25: The method, apparatus, or non-transitory computer-readable medium of any of aspects 22 through 24, where performing the second read operation is based at least in part on a condition of the memory device.

Aspect 26: The method, apparatus, or non-transitory computer-readable medium of aspect 25, where the condition includes a temperature of the memory device satisfying a threshold.

Aspect 27: The method, apparatus, or non-transitory computer-readable medium of any of aspects 25 through 26, further including operations, features, circuitry, logic, means, or instructions, or any combination thereof for setting a flag in a register based at least in part on the condition of the memory device.

Aspect 28: The method, apparatus, or non-transitory computer-readable medium of any of aspects 22 through 27, where performing the second read operation is based at least in part on an indicator in the first command.

Aspect 29: The method, apparatus, or non-transitory computer-readable medium of any of aspects 22 through 28, further including operations, features, circuitry, logic, means, or instructions, or any combination thereof for changing, after performing the first read operation, a parameter associated with a trim set associated with the page, where performing the second read operation is based at least in part on changing the parameter.

Figure 11:
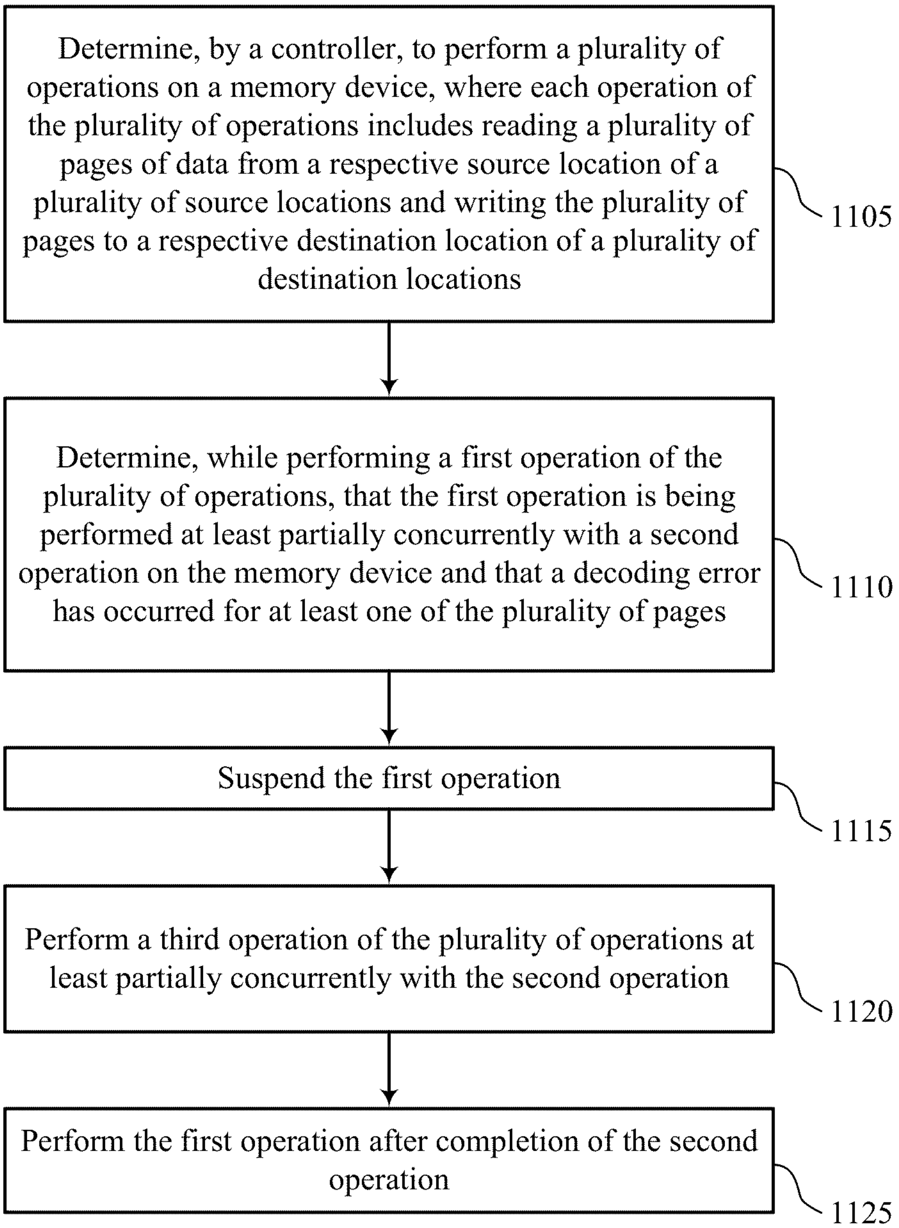

FIG. 11 illustrates a flowchart showing a method 1100 that supports efficient data management for memory system error handling in accordance with examples as disclosed herein. The operations of method 1100 may be implemented by a memory system or its components (e.g., a controller) as described herein. For example, the operations of method 1100 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 1105, the method may include determining, by a controller, to perform a plurality of operations on a memory device, where each operation of the plurality of operations includes reading a plurality of pages of data from a respective source location of a plurality of source locations and writing the plurality of pages to a respective destination location of a plurality of destination locations. The operations of 1105 may be performed in accordance with examples as disclosed herein. In some examples, aspects of the operations of 1105 may be performed by an operations manager 630 as described with reference to FIG. 6.

At 1110, the method may include determining, while performing a first operation of the plurality of operations, that the first operation is being performed at least partially concurrently with a second operation on the memory device and that a decoding error has occurred for at least one of the plurality of pages. The operations of 1110 may be performed in accordance with examples as disclosed herein. In some examples, aspects of the operations of 1110 may be performed by a decoder 635 as described with reference to FIG. 6.

At 1115, the method may include suspending the first operation. The operations of 1115 may be performed in accordance with examples as disclosed herein. In some examples, aspects of the operations of 1115 may be performed by an operations manager 630 as described with reference to FIG. 6.

At 1120, the method may include performing a third operation of the plurality of operations at least partially concurrently with the second operation. The operations of 1120 may be performed in accordance with examples as disclosed herein. In some examples, aspects of the operations of 1120 may be performed by an operations manager 630 as described with reference to FIG. 6.

At 1125, the method may include performing the first operation after completion of the second operation. The operations of 1125 may be performed in accordance with examples as disclosed herein. In some examples, aspects of the operations of 1125 may be performed by an operations manager 630 as described with reference to FIG. 6.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 30: A method, apparatus, or non-transitory computer-readable medium including operations, features, circuitry, logic, means, or instructions, or any combination thereof for determining, by a controller, to perform a plurality of operations on a memory device, where each operation of the plurality of operations includes reading a plurality of pages of data from a respective source location of a plurality of source locations and writing the plurality of pages to a respective destination location of a plurality of destination locations; determining, while performing a first operation of the plurality of operations, that the first operation is being performed at least partially concurrently with a second operation on the memory device and that a decoding error has occurred for at least one of the plurality of pages; suspending the first operation; performing a third operation of the plurality of operations at least partially concurrently with the second operation; and performing the first operation after completion of the second operation.

Aspect 31: The method, apparatus, or non-transitory computer-readable medium of aspect 30, where suspending the first operation is based at least in part on determining that a first set of pages associated with the first operation occupy a first subset of a plurality of latches of the memory device and that a second set of pages associated with the second operation occupy a second, remaining subset of the plurality of latches.

Aspect 32: The method, apparatus, or non-transitory computer-readable medium of any of aspects 30 through 31, where the first operation is associated with a first source location of the plurality of source locations and the third operation is associated with a second source location of the plurality of source locations.

Aspect 33: The method, apparatus, or non-transitory computer-readable medium of any of aspects 30 through 32, where the plurality of source locations are within a source block and the plurality of destination locations are within a destination block.

Aspect 34: The method, apparatus, or non-transitory computer-readable medium of any of aspects 30 through 33, where the plurality of operations include a garbage collection operation for multi-level cells of the memory device.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication,""conductive contact,""connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if,""when,""based on," or "based at least in part on" may be used interchangeably. In some examples, if the terms "if,""when,""based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on,""based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

a controller configured to couple with a memory device, wherein the controller is configured to:

perform a first portion of a first operation on the memory device, wherein the first portion of the first operation comprises reading a plurality of pages of data from a first address of the memory device and loading the plurality of pages of data into a first subset of a set of latches of the memory device;

suspend the first operation based at least in part on determining to perform a second operation on the memory device that utilizes a second subset of the set of latches;

perform the second operation on the memory device, wherein performing the second operation comprises overwriting first data in at least one of the first subset of the set of latches with second data associated with the second operation; and perform a third operation on the memory device, wherein the third operation restores the first data to the at least one of the first subset of the set of latches, the third operation comprising reading the first data from the first address of the memory device.

2. The apparatus of claim 1, wherein to perform the first portion of the first operation, the controller is configured to:

load the plurality of pages of data into respective latches for writing to a destination block of memory.

3. The apparatus of claim 1, wherein the controller is further configured to:

perform a second portion of the first operation on the memory device after performing the third operation that restores the first data to the at least one of the first subset of the set of latches.

4. The apparatus of claim 3, wherein to perform the second portion of the first operation, the controller is configured to:

program a plurality of pages of a destination block with a plurality of pages of data loaded in respective latches.

5. The apparatus of claim 1, wherein the plurality of pages of data correspond to pages of multi-level memory cells of the memory device.

6. The apparatus of claim 1, wherein the second operation is associated with a read command.

7. The apparatus of claim 1, wherein to perform the second operation, the controller is further configured to:

perform a plurality of read operations for a page of the memory device.

8. The apparatus of claim 7, wherein at least one of the plurality of read operations for the page is associated with obtaining soft information for the page.

9. An apparatus, comprising:

a controller configured to couple with a memory device, wherein the controller is configured to:

perform a first portion of a first operation on the memory device, wherein the first portion of the first operation loads a plurality of pages of data from the memory device into respective latches of the memory device;

receive from one of the respective latches, first data associated with a first page of the plurality of pages of data;

perform a first decoding process on the first data;

perform a second operation on the memory device to read second data associated with the first page into at least one latch of the respective latches based at least in part on a decoding failure of the first decoding process, wherein performing the second operation overwrites data loaded in the at least one latch with the second data; and perform a second decoding process on the first page using the first data and the second data.

10. The apparatus of claim 9, wherein the controller is further configured to:

restore overwritten data back into the at least one latch after performing the second decoding process.

11. The apparatus of claim 10, wherein the controller is further configured to:

perform a second portion of the first operation on the memory device after restoring the overwritten data back into the at least one latch.

12. The apparatus of claim 9, wherein the controller is further configured to:

read the data from the at least one latch into a buffer of the controller before performing the second decoding process; and restore the at least one latch with the data from the buffer after performing the second decoding process.

13. The apparatus of claim 9, wherein the controller is further configured to:

change, after performing the first operation, a parameter associated with a trim set associated with the first page, wherein the controller is configured to perform the second operation based at least in part on changing the parameter.

14. A memory device, comprising:

a page of memory;

a plurality of latches; and a controller configured to cause the memory device to:

receive a first command to read the page of memory;

perform, based at least in part on receiving the first command, a first read operation on the page of memory to obtain a first set of bit values associated with the page of memory;

output the first set of bit values associated with the page of memory to a first latch of the plurality of latches;

perform, in response to a temperature of the memory device satisfying a threshold, a second read operation on the page of memory to obtain a second set of bit values associated with the page of memory, wherein the second read operation is performed without reception of a second read command for the second read operation in response to the temperature of the memory device satisfying the threshold; and output the second set of bit values associated with the page of memory to a second latch of the plurality of latches.

15. The memory device of claim 14, wherein the second read operation on the page of memory is associated with obtaining soft information for the page of memory.

16. The memory device of claim 14, wherein the controller is configured to perform the second read operation at least partially concurrently with outputting the first set of bit values to the first latch.

17. The memory device of claim 14, wherein the controller is further configured to:

change, after performing the first read operation, a parameter associated with a trim set associated with the page of memory, wherein the controller is configured to perform the second read operation based at least in part on changing the parameter.

* * * * *